Patented Apr. 27, 1943

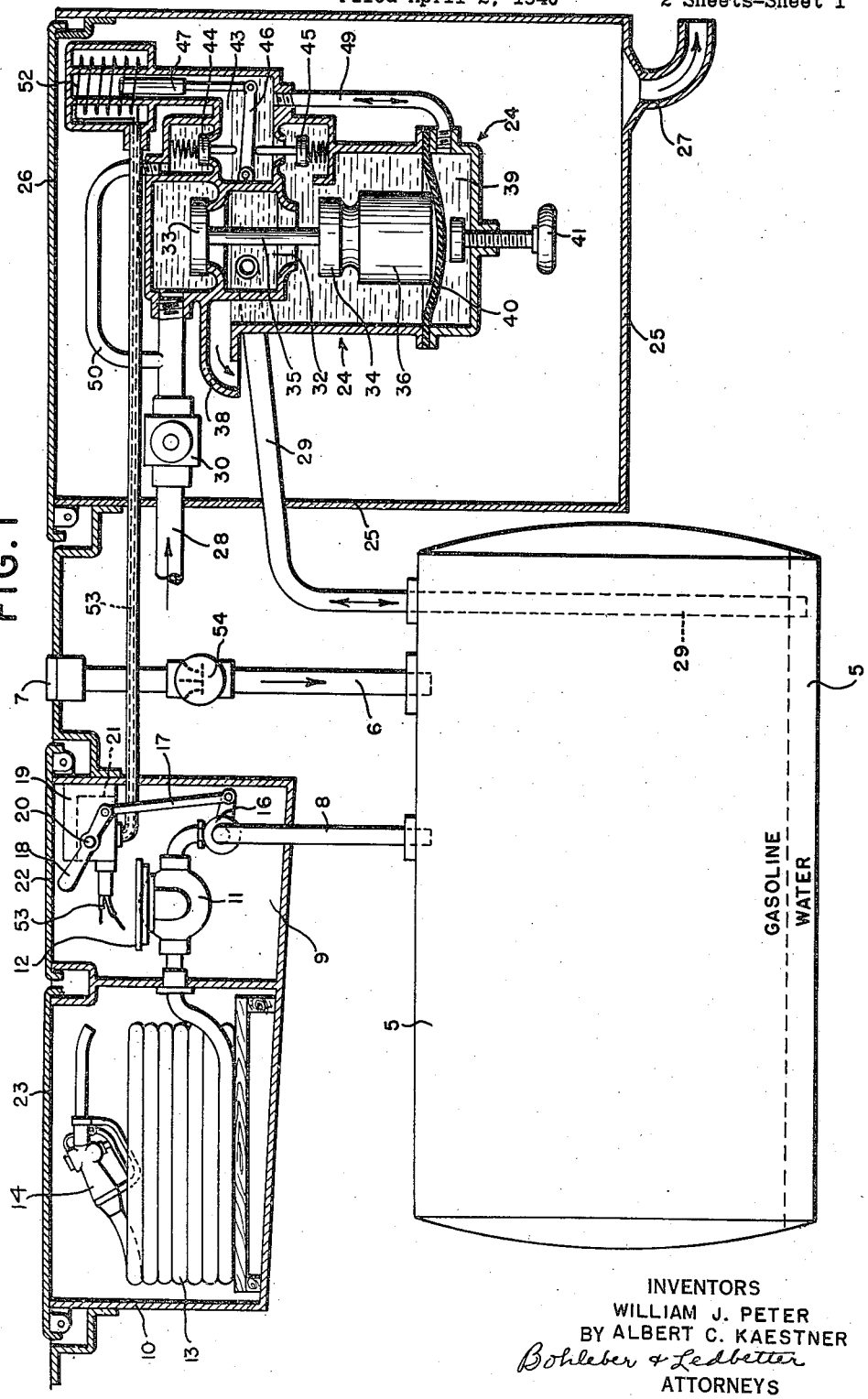

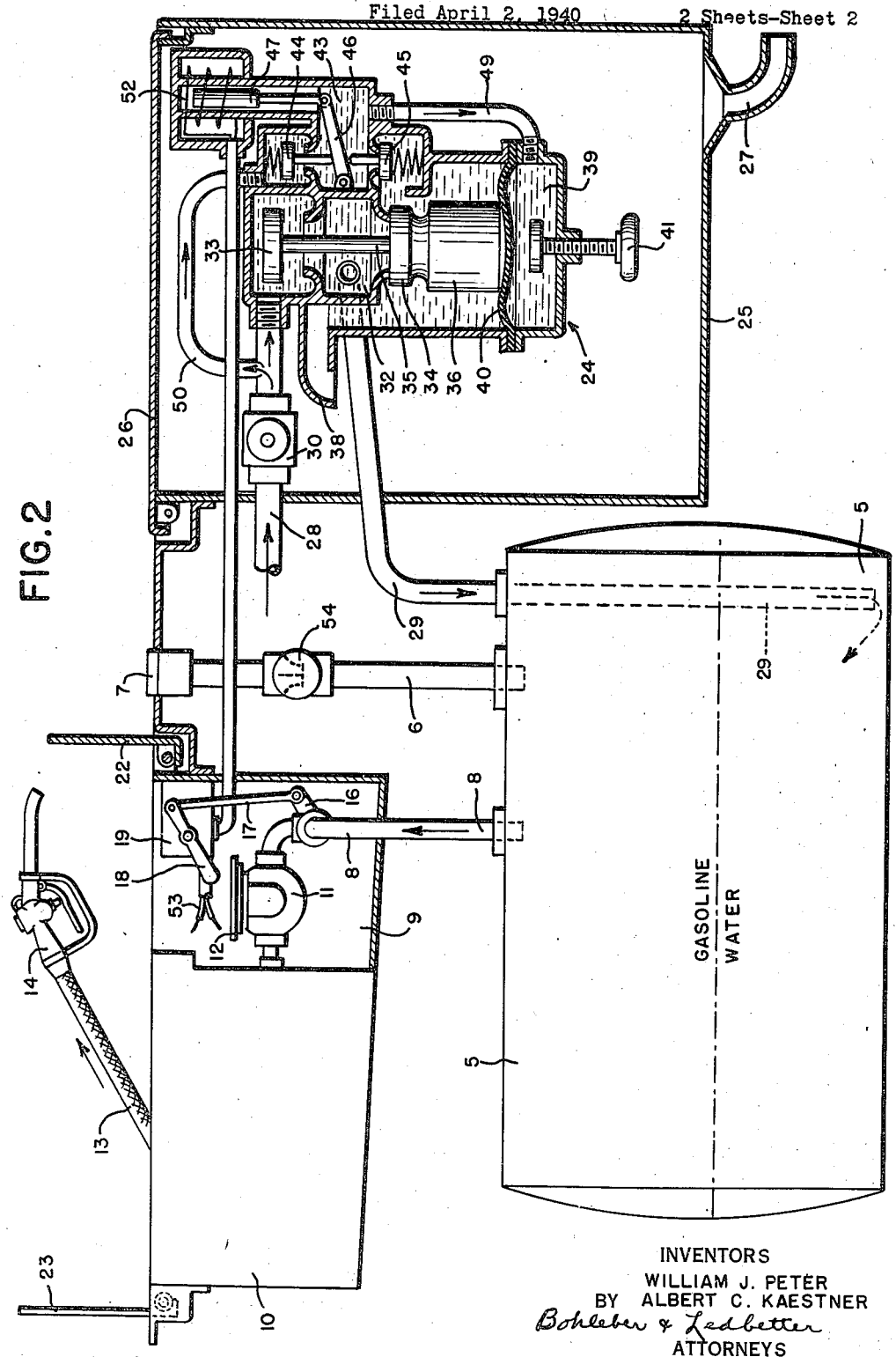

2,317,800

UNITED STATES PATENT OFFICE 2,317,800

HYDRAULIC STORAGE AND DISPENSING SYSTEM

William J. Peter, New York, and Albert C. Kaestner, Crestwood, N. Y., assignors to Aqua Systems Incorporated, New York, N. Y., a corporation of New York Application April 2, 1940, Serial No. 327,388

11 Claims. (Cl. 221—67)

This invention relates to liquid-handling systems for motor-fuel, gasoline, oil and other liquids lighter than water and immiscible therewith; and more particularly the invention relates to a new and improved hydraulic storage and dispensing system for storing and dispensing gasoline and the like.

Our combination storage-delivery system is useful in connection with fueling automotive vehicles, airplanes, and motor boats, etc., thus serving garages, parking buildings, service stations and airports; and the system is particularly efficient where the standards of service and quality of motor-fuels are high as regards the furnishing of pure gasoline unimpaired by reason of its period of storage or the addition of new gasoline from time to time to that previously left over in storage.

Consequently, this invention and the apparatus or system thereof is especially useful and recommended for airports and the like where it is desirable to store and preserve quantities of motor-fuel and quickly service the aircraft by dispensing pure gasoline to their fuel tanks. The invention especially lends itself to underground storage-dispensing systems and therefore is well suited to airports, as well as garage buildings, for storing a large amount of fuel or other liquid and dispensing it in metered quantities from a plurality of service stations distantly located from a storage tank.

The immiscibility of water and the lighter weight gasoline is availed of in practicing this invention, and we employ the water flotation principle not only for storing the gasoline free from contact with the atmosphere but for dispensing it, that is, displacing the gasoline by water power from the place of storage into the fuel tanks of the airplane or other vehicle being fueled.

An object of the invention is to produce improvements in a hydraulic storage and delivery system, comprising a new combination in a water-flotation or displacement means, for dispensing gasoline which is maintained or stored in a sealed condition entirely free from and against contact with the atmosphere, thus preventing evaporation of the stored gasoline or other volatile liquids. In this connection, the stored volatile liquid remains in storage floating on water and entirely free from contact with the atmosphere because all the air is not only expelled when the storage system receives gasoline but thereafter remains excluded, and the system is sealed from the outer atmosphere as well. Thus, the stored gasoline is neither in contact with the air inside the system nor the atmosphere outside thereof.

A further object is to produce improvements in a new combination hydraulic storage and delivery system which dispenses gasoline by the use of (a) water power or water pressure as the dispensing or propelling agent or force, together with (b) control means for utilizing the same water power in initially effecting the operation of a new master-control valve, which in turn controls the flow of said water employed for displacement of the gasoline and hence the dispensing thereof from a storage tank out through one or more remotely located meter dispensing stands or stations. Consequently, this invention renders it possible to employ the same source of water power for the control of the apparatus as is used for the actual dispensing force.

As regards the aforementioned master-control valve means per se, a further important object is to produce improvements in a water-operated hydraulic valve means for controlling the flow of water to and from a storage tank for effecting the sealed storage of gasoline and the dispensing thereof through a meter and hose line at one or more dispensing stations remotely located for fueling automotive vehicles and the like, the valve means being operated from the same water-power source as is used to perform the storage and dispensing operations, and being further characterized by freedom from by-passing and pressure-relieving devices.

A further important object is to produce a hydraulic storage and dispensing system having a storage tank for gasoline and the like, with one or more meter dispensing stations remotely located therefrom, together with remote manual-control means at said stations for not only applying and relieving the water pressure within the storage tank for starting and stopping the dispensing operations, but also for permitting the water within the tank to automatically discharge therefrom upon an increase of volume of the gasoline.

A further object is to produce a hydraulic dispensing system wherein the filling of the storage tank means with gasoline can be carried on conjointly with the dispensing of gasoline from said tank means. This is accomplished by employing the aforementioned master-control valve for performing the object in question by which, if the tank means is being filled by one attendant and some other attendant starts a dispensing operation, the said filling operation is automatically suspended during said dispensing operation, and when the latter stops the former automatically resumes without any attention to the system from either of the attendants.

The accompanying drawings show the underlying principles of this new combination, and in particular show the new part or parts thereof including the water-actuated master-control valve which performs new functions in the combination. And certain other features and parts (ordinarily constituting a part of the commercial form of our hydraulic system but not actually required herein to disclose the fundamentals of the present invention) are omitted for clarity so as to simplify the description of the new features and their related functions.

With the foregoing and other objects in view, there is shown and explained one example of the invention (herein presented in its simpler form with a minimum number of parts for clarity), it being understood that changes may be made without departing from the principle of the invention which is susceptible of embodiment in forms of construction and operation other than here shown in a diagrammatic way in the accompanying drawings, wherein:

Figure 1 is a side view in longitudinal section of the combined hydraulic storage and dispensing system, showing its underground storage tank (in elevation) with the control and dispensing apparatus placed thereabove and also underground. The new hydraulically-operated master-control valve, as an element of and making a new combination, is enlarged somewhat beyond its natural size and comparative scale with other parts for the purpose of this description. This view shows the storage and dispensing system at rest, that is, not dispensing.

Figure 2 shows a view similar to Figure 1, except that the system is in a state of dispensing the stored liquid, such as gasoline, that is, the apparatus is under dispensing pressure; and it will be noted that the storage tank contains more water and less gasoline than in Figure 1, due to dispensing operations already performed by the apparatus, the dispensing hose of which is about to be returned to its underground storage compartment.

The stored "gasoline" or oil floats on top of the displacement "water," as indicated by these legends (Figures 1 and 2) printed on the storage tank means. The dotted horizontal liquid line between the legends designates the upper surface of the water and the lower surface of the lighter weight gasoline floating thereon. The system (its tank) is always full of the two liquids employed (gasoline and water) as a result of which no free or empty space occurs in the one or more storage tank or tanks employed in this system; consequently all air is excluded therefrom and evaporation is precluded.

Referring now to the drawings for a further description of the illustrated example of the invention, a conventional underground storage tank means 5 is shown; it is usually of large capacity and from it the gasoline or other liquid immiscible with water is adapted to be dispensed from time to time in small metered quantities. A fill pipe line 6 extends downwardly from the surface or ground line and into the top wall of the tank where it is sealed therein, that is, it has an air-tight screw connection with the tank, as in the case of all piping and other parts. A removable fill cap 7 closes the fill pipe 6 at the ground surface. This pipe 6 is used for the purpose of filling the storage tank 5 with gasoline or other liquid to be stored and thereafter dispensed to automotive vehicles, airplanes and the like. While one storage tank is shown in this example of the invention, several tanks are frequently employed in a large installation.

A dispensing pipe line 8 leads upwardly from the inside uppermost wall portion of the gasoline storage tank 5 and into a housing or fueling-pit box comprising a meter and switch compartment 9, together with an adjacent dispensing-hose compartment 10. The pipe 8 conveys the dispensed gasoline by leading it through a meter 11 having a dial or other visible indicator 12 and then connects with a flexible dispensing hose 13 protected in the pit box compartment 10 when not in use. A conventional dispensing-nozzle valve 14 is carried on the free end of the hose 13 in the usual way and remains normally closed by known spring loading means when not in use to seal the gasoline in the hose between dispensing operations. The dispensing valve 14 is opened manually by the operator, after its nozzle is inserted in the fuel tank to be filled, and gasoline is then automatically dispensed from the tank 5 through the hose.

A shut-off valve 16 is included in the dispensing pipe 8 on the inlet side of the meter 11 and has an operating link 17 extending upwardly therefrom. A manually-operable valve and switch control handle 18 is pivotally mounted on a switch box 19 having a switch-operating shaft 20 journalled therein. The handle 18 is fixed on the switch shaft 20 and is operatively connected with the upper end of the link 17. The box 19 encloses any suitable form of electric switch 21, shown in dotted lines Figure 1, and operated by the shaft 20 for controlling an electrical circuit for purposes later explained. The control handle 18, therefore, is interlocked with the switch 21 and the shut-off valve 16 so as to simultaneously control the opening and closing of the valve and switch. Consequently, when the valve 16 is open the switch 21 is closed and vice versa. This device comprising the switch-and-lever means 18, 21 is a remote control for the entire system, the importance of which will be more fully understood after presenting the entire description of the invention.

The meter and switch compartment 9 is covered by a lid 22, and the hose compartment 10 is similarly covered by a lid 23, both of which are preferably hinged to stand up, as shown in Figure 2. The two hinged lids provide a quickly accessible cover means for the hose and meter compartments of the fueling-pit box 9, 10 and are readily opened by tilting them upwardly when making ready for a dispensing operation. The fueling-pit box covers 22 and 23 form a flush surface with the ground line so as to be completely out of the way of vehicle wheels passing thereover.

The fueling-pit box 9, 10 constitutes a meter dispensing station and any number may be fed from the one or more storage tanks 5 of the system. In the case of garage buildings and the like, other than for air ports, a different form of metered dispensing station is employed, say a curb-pump stand or a wall panel, as will be understood by those conversant with the art. The pit-box dispensing station 9, 10 shown herein is by way of example as being similar to the type which is generally used at airports.

We now come to a description of the improvements in the new hydraulically-operated master-control valve, indicated generally at 24, which designates the housing or valve cage thereof. It is operated by water power, say the same water power as used for the power-dispensing operation; and thus our new valve means, for this and other reasons, modifies and coacts with the combination or system as a whole. This master-valve means 24 is enclosed within an underground box or compartment 25, covered by a hinged lid 26 flush with the ground line similar to the previously mentioned lids or covers 22 and 23, where this storage-dispensing system is installed underground as here shown. The master-valve compartment 25 has a water drain spillway discharge 27 adapted to be connected with a waste or sewer pipe (not shown) to convey water away from the apparatus to the city sewer main, or other waste disposal, after the water has been used in connection with storing the gasoline in the tank 5, dispensing it therefrom, and operating the master-valve means 24.

A water-power supply or feed pipe 28 leads from any suitable source (not shown) of water having a sufficient head or pressure to dispense the gasoline through the lines 8 and 13. This pipe connects with the upper end of the master-control valve means 24; and the water flows in one direction only through this pipe 28 as shown by its arrow, namely, into the master valve 24. Sometimes in making an installation of this system, the water-power pipe 28 is connected to a tower water-supply tank as the power source for dispensing gasoline, while at other times the pipe 28 may be connected with the city water main as the power source.

A combination water inlet and outlet or tank pipe 29 is pitched to lead and drain downwardly from the water-control master-valve 24 through the top of the tank 5 where it is sealed therein and terminates near the inside bottom of the tank; and the water flows in both directions through this pipe 29, as shown by its arrow in Figure 1. Water flows into the bottom of the tank 5 for dispensing gasoline through the hose 13 and flows out through pipe 29 when filling the tank with gasoline through the fill pipe 6.

The water inlet and outlet pipe 29 preferably extends downwardly through the top of the tank 5 so as to have a portion of its length disposed within the tank, or it may enter the bottom of the tank, depending upon procedure and requirements of the particular installation being made at the time. Briefly, water under pressure flows from the feed pipe 28 into the upper portion of the master-control valve 24 and thence downwardly through the tank pipe 29 to the bottom of the tank 5, and the water thus admitted under the gasoline constitutes the propelling force for displacing the gasoline upwardly through the dispensing pipe 8 heretofore explained.

In some installations, a water pressure-reducing valve 30 is included in the water-power pipe 28 and located within the master-valve compartment 25 for the purpose of appropriately regulating the input power or pressure of the water received from some water-pressure source (not shown) to which the outer end of the feed pipe 28 is connected, as heretofore explained. The pressure-reducing valve 30 is convenient for cutting down the force or pressure of the water before it reaches the master-control valve 24, so as to regulate the apparatus to an appropriate dispensing pressure and velocity flow of gasoline from the nozzle valve 14 for rapid dispensing operations. A water-power head or pressure of 35 to 45 pounds, more or less, is usually employed, and the reducing valve 30 is adjusted accordingly.

A master-valve chamber 32 is formed within the upper portion of the valve housing 24 and below the top-enclosing wall thereof, and the tank pipe 29 connects with and opens into this valve chamber. It is seen that the water-power pipe 28 connects with the master-valve housing 24 above the valve chamber 32 in order to directly communicate therewith. A master inlet-valve head 33 normally closes the upper ported end of the valve chamber 32 when the apparatus is not dispensing (Figure 1); and also an exhaust or outlet master-valve head 34 remains normally open from the lower ported end of the valve chamber 32 when not dispensing. The inlet port (upper) and the outlet port (lower) of the valve chamber 32 is alternately opened and closed by the valve heads 33 and 34, respectively.

The movable master-valve heads 33 and 34 are connected by a common valve stem 35. A weight 36 is attached to the lower end of the outlet-valve head 34 to maintain it open in downwardly-limited position, and to keep the inlet-valve head 33 normally closed against the upper ported end of the valve chamber 32. Thus, when the system is not dispensing (Figure 1), the weight 36 acts on this master-valve mechanism to shut off communication between the valve chamber 32 and the water feed pipe 28. However, when dispensing (Figure 2), the master-inlet valve 33 is open and the outlet valve 34 is closed, so as to thereby connect the feed pipe 28 through the master-valve chamber 32 with the tank pipe 29.

A water spillway or open discharge port 38 opens the master-valve housing 24 into its underground compartment 25, so as to spill the waste water from the system and tank 5 by draining the water out through the sewer-drain connection 27 when filling the tank with gasoline, as later described. The spill port 38 has its outlet located above the entry of the tank pipe 29 in order to leave the valve housing 24 full of water at all times up to the level of said pipe. Likewise the pipe 29, pitched downwardly toward the tank, also remains filled with water during normal use of the system, since the spill port 38 thereabove cannot drain the water from said pipe. The water-filled valve housing 24 and pipe 29 provide a hermetically sealed elastic or yieldable closure against atmospheric communication between the tank 5 and outer air.

A diaphragm chamber 39 is formed within the lower end of the master-valve housing 24 by a flexible diaphragm 40 which has its perimeter sealed within the housing 24 as shown, or by other suitable means. This flexible diaphragm 40 is appropriately made or vulcanized of fabric and rubber composition or of any other suitable material such as leather or the like so as to provide a yielding center portion. The diaphragm is capable of deflection upwardly and downwardly for reversing the position of the master-valve means 33, 34 to set same to dispense (Figure 2) or cut-off and not dispense (Figure 1).

The depending valve weight 36 stands close to or may engage the diaphragm 40, although the latter does not sustain the weight of the member 36 when in down position. The weight must positively close the valve 33, and this closing function is assisted by the water pressure on top of the valve head 33. The weight 36 is sufficiently heavy to maintain the diaphragm 40 in its normally-down position (Figure 1) when said diaphragm is not energized. When energized by water pressure admitted into the lower chamber 39, the diaphragm 40 moves upwardly (Figure 2) and lifts the weight 36 and valve means 35. It will now be seen that the combination of the weight 36 and diaphragm 40 constitute power means for operating the main water-control valve 35.

A hand screw 41 is carried in the bottom of the valve housing 24 for occasional manual use by an operator or service man should it become necessary to run the valve stem 35 upwardly to shut the outlet valve 34 and open the inlet valve 33 in connection with examining or servicing the system or valve apparatus in the event water power is not available for doing so, or in the event of other need. The operator can reach the hand screw 41 from the upper open top of the compartment 25 and screw the diaphragm 40 upwardly should the automatic water control of the master-valve fail and adjustment thereof be required, when the water flow is shut-off in the feed pipe 28.

A relay or pilot-valve chamber 43 is formed within the housing of the master-control valve means 24 for the purpose of automatically controlling the operation of the diaphragm 40. A relay or pilot-inlet valve 44 normally closes an upper inlet port leading from the water-power pipe 28 down into the relay-valve chamber 43; and a relay or pilot-inlet valve 45 normally opens an outlet port in the bottom of the valve chamber 43. Each relay valve 44 and 45 is spring loaded with a suitable coil spring of about equal compression adapted to alternately open and close each valve.

The relay valve heads 44 and 45 have stems projecting into the valve chamber 43 in axial alignment and terminating with an operating space remaining therebetween. A relay-valve operating arm 46 has its inner end carried on a stationary pivot, as for example on the outer cylindrical wall of the master-valve chamber 32, and is disposed between the adjacently spaced ends of the two valve stems and in close operative engagement therewith. The outer free end of the lever arm 46 is pivotally connected with a solenoid plunger 47 for swinging the arm on its pivot and changing the setting of the relay-valve means 44, 45 from dispensing (Figure 2) to non-dispensing (Figure 1) position.

A small water inlet and outlet or diaphragm pipe 49 connects the relay-valve chamber 43 with the diaphragm chamber 39, and water under pressure runs through this pipe to and from the diaphragm chamber as indicated (Figure 1) by the arrow. A relay or small water-feed pipe 50 connects the main water-power pipe 28 with the relay-inlet valve 44 so as to flood the relay-valve chamber 43 with water under pressure when the valve 44 is opened and the outlet valve 45 is closed. This secondary water-feed pipe 50 is usually connected with the primary water-feed pipe 28 between the pressure-reducing valve 30 and the master valve 24, although this position is not essential. Water under pressure from the feed pipe 28 flows through the relay pipe 50, thence through the relay-valve chamber 43, downwardly through the pipe 49, and into the diaphragm chamber 39. This operation energizes the diaphragm 40 and deflects it upwardly (Figure 2), thereby lifting the weight-loaded master-valve means 35 by which to close the outlet 34 and open the inlet 33.

The aforementioned solenoid plunger 47 is actuated up and down in a suitable guide by an electro-magnet or solenoid coil 52. Electrical circuit wires 53 are connected with a source of electrical current in any known way, extended through the switch box 19 where the switch 21 is connected therein, and the wiring is connected with the solenoid 52. This control circuit 53, for the master-valve means 24, is carried in a conduit in the usual way extending from the fueling-pit box 9, 10 to the solenoid 52 in the compartment 25.

According to the foregoing, it is seen that the master valve means 24 comprises a main water-power control-valve means 33, 34 of large size for starting and stopping the oil or gasoline dispensing operations, in combination with a relay or pilot-valve means 44, 45 of smaller size for operating said main water-control valve; and water pressure constitutes the power means for this plural-valve arrangement. Double acting poppet valves 33 and 34 as well as 44 and 45 are shown, but other types of movable valve elements may be employed instead thereof. The same water-power source can be availed of for both functions, that is, for dispensing and for operating the water-control valve. This combination valve means is rugged and dependable in operation and its employment evolves a new combination hydraulic storage and dispensing system.

A description of the operation and use of this hydraulic storage and dispensing system will now be given. Reference is first made to the manner of filling the tank 5 with gasoline and dispensing it therefrom, together with an explanation of other facts and conditions characterizing this invention in general.

When a storage and dispensing system of this character is first installed, the gasoline-storage tank 5 is initially filled with water, and this water-filling operation usually takes place after the tank 5 is properly located in the ground. The tank being filled with water in any convenient manner, the master valve 25 and its connections are also completed, whereupon the diaphragm chamber 39 is initially filled with water under pressure and thereafter always remains filled.

Under water pressure, the diaphragm 40 bulges upwardly which reverses the setting of the master-valve means 33, 34 from non-dispensing (Figure 1) to dispensing (Figure 2) position. The water pipes 28 and 29 are now in direct communication, and the tank 5 can be completely filled with water which is an operation initially to be performed prior to the first filling of said tank with gasoline. All the air is now excluded from the tank 5 and storage system. Having first filled the tank with water, through the convenient expedient of the master-control valve, the fueling-pit box 9, 10 installation now may be completed. Then the control handle 18 and shut-off valve 16 are set to non-dispensing (Figure 1) position which shuts off the water-feed pipe 28 and opens the tank pipe 29 to the water spill port 38 and waste drain 27, although no water as yet runs from pipe 29.

The hose of a gasoline tank car or delivery truck (not shown) is now attached to the fill pipe 6 and the gasoline usually runs by gravity into the tank 5, thus driving or discharging the water outwardly through pipe 29, thence through the spill port 38, and out through the water drain 27 to the sewer. This gasoline filling and water discharge operation continues until the water level recedes to a predetermined low point (Figure 1) in the tank 5, thus completely filling it with stored gasoline. A little water always remains in the bottom of the tank to cover the lower extremity of the tank pipe 29 thereby acting as a water seal against the atmosphere which prevents all atmospheric contact with the gasoline.

To now dispense the gasoline, at any one or more dispensing stations 9, 10, the control handle 18 is pushed downwardly (Figure 2) to set the master-valve means 33, 34 for the dispensing operation and to open the gasoline shut-off valve 16 at the meter 11. Water under pressure from the feed pipe 28 is now applied to the bottom of the tank 5 under the gasoline thereby placing it under dispensing pressure through the meter 11 and into the hose 13. The hose is withdrawn from its compartment 10, as seen in Figure 2, and the nozzle 14 thereof is introduced into the vehicle tank to be fueled. The operator opens the nozzle valve 14 and dispenses gasoline into the fuel tank until the desired amount is indicated on the meter dial 12, whereupon he releases the handle of the dispensing nozzle and it snaps closed, thus stopping the dispensing flow.

When the operator completes a dispensing operation he returns the hose 13 to its compartment and pulls the remote-control handle 18 (Figure 1) upwardly. That manual operation acts to close the gasoline shut-off valve 16, de-energizes the solenoid 52, closes the relay inlet valve 44 and opens relay outlet valve 45, whereupon the master-valve weight 36 gravitates downwardly thereby forcing the water from the diaphragm chamber 39 out through pipe 49, through the outlet relay 45, and thence through drain or spill port 38 along with the volume flow of waste water coming from tank 5. This operation closes the master-inlet valve 33 and opens the outlet 44 which relieves the system of dispensing pressure. Consequently, the tank 5 is not under operating pressure when not dispensing, but the tank and system remain completely full of the two immiscible liquids (gasoline and water) irrespective of their relative proportions which prevents atmospheric contact with the stored gasoline and hence prevents evaporation.

The temperature variation of the two liquids (gasoline and water) in the tank 5 is not appreciable, except seasonably, due to the fact that the tank is buried in the ground. Such temperature variation as may occur causes some contraction and expansion of the liquids in the tank. For example, a rise in temperature may cause the two liquids, particularly the gasoline, to expand in the tank, in the event of which a corresponding volume of water is forced from the bottom of the tank out through pipe 29 and from the master-valve water drain 38 to the waste line 27. This compensation at normal atmospheric pressure takes place by reason of the master-valve outlet 34 remaining normally open when the system is not dispensing.

On the other hand, a drop in temperature causes a shrinkage or contraction of volume of the two liquids in the tank 5, particularly the gasoline. It then follows that an equal volume of water in the pipe 29 flows into the tank thereby maintaining it full. Inasmuch as the tank pipe 29 is comparatively long and usually from two and one-half to four inches or of greater diameter in larger capacity installations for effective operation of this hydraulic system, the volume of water therein is adequate to compensate for contraction of the liquids in the tank 5 and keep it full to the top. Should the water in pipe 29 partially or completely drain into the tank to compensate for contraction of the liquid or liquids therein, it follows that the next dispensing operation will again leave the pipe full of water.

The immediate foregoing description makes it clear that the body of gasoline floating on water in the tank 5 is maintained at all times against the roof of the tank, which is to say that no air space or void exists in the tank. Since no air pocket exists in the tank, the stored gasoline does not have contact with air inside the tank, nor is there any outside communication with the atmosphere. Therefore, the gasoline is stored indefinitely without loss of strength commonly caused by evaporation prevalent in non-hydraulic storage and dispensing systems.

With all the foregoing description of the construction and mode of operation of this storage-dispensing system in mind, particularly filling and dispensing, we revert to the fill pipe line 6 for special mention of another feature of this invention having to do with the utility and characteristics of the master-control valve 24. It is noted that said fill pipe is equipped with a check valve 54. This check valve 54 closes upwardly against an upward force or attempted back flow of gasoline in the pipe 6, but it opens downwardly when filling the tank 5 through the fill cap 7. The master-control valve 24, in combination with the check valve 54, possesses a new function which, among other things, renders the system as a whole new and advantageous over the prior art. The combination of the two valves 54 and 24 affords a new result by permitting conjoint filling of and dispensing from the tank means 5, that is, said dispensing and filling can be carried on without interference with each other, as will now be described.

It sometimes requires several hours to fill the large capacity tank or tanks 5 from a gasoline tank car on the railway siding. A hose line (not shown) is run from the tank car and connected with the fill pipe line 6 at fill cap 7, and the gasoline then flows by gravity from the tank car into the storage tank means 5. As the gasoline flows down past the check valve 54, the water under the gasoline is forced from the tank up through pipe 29 and out the lower end of valve chamber 32, thence through the spill port 38, and to the sewer through the water drain 27.

While the foregoing gasoline filling operation is in progress, dispensing may be initiated from any one or more of the fueling-pit stations 9, 10 without disconnecting the fill hose line at fill cap 7 from the tank car and without any attention whatsoever by the tank-car operator and also without attention from the dispensing operator working at the remotely located fueling station 9, 10. When the dispensing operator pushes the control lever 18 downwardly to start dispensing (Figure 2), it follows that the master-valve outlet 34 (previously open) automatically closes and its inlet 33 opens. Instantly, a greater head of water pressure from the water-power pipe 28 is applied within the bottom of the tank 5 than the head of gasoline filling pressure applied to the fill pipe 6 at the top of the tank. This differential pressure condition results in upwardly closing the fill-check valve 54 which automatically suspends the filling operation from the tank car hose attached at the fill cap 7.

Therefore, dispensing can now take place through the dispensing hose 13 without any manual readjustment or change of any valve setting in the entire system. After the dispensing operator has completed the dispensing of gasoline (Figure 2) to an airplane or other vehicle he restores the remote-control lever 18 to its cut-off position (Figure 1), whereupon the filling of the tank 5 with gasoline through the check valve 54 is automatically resumed. This automatic resumption of filling is due to the fact that the water in the feed pipe 28 is again cut off and the master-valve outlet 34 is again open to the spillway 38, 27 so that the filling of gasoline through pipe 6 is resumed by forcing water from the tank 5, thereby making room for the gasoline coming from the tank car.

Now it is seen by reason of this invention that dispensing at a station 9, 10 (which at some airports or fields may be a mile or so from the storage tank) and filling at the fill cap 7 may automatically take place substantially simultaneously, that is, conjointly, without one operation interfering with the other. This automatic reverse-operating control is an advantage over prior systems and the operation thereof where it was necessary for the old system to have its valve controls manually set and reset by the operators to permit a gasoline dispensing operation from the storage tank during the necessary filling thereof. The gravity flow of gasoline or oil from a tank car on a railway siding to the tank 5 of this new dispensing system is expedited by reason of the coordinate action of the fill-check valve 54 and the new master-valve means 24.

The foregoing is accomplished by the remote-control means 18 which not only relieves the hydraulic pressure from the system but more particularly opens the master-outlet valve 34 so that the displacement water accumulated in the tank 5, due to oil or gasoline dispensing operations by water power or force, can at any time automatically discharge or spill to the sewer line 27 to either make room for additional stored gasoline entering the tank through the fill means 6, 54 or the expansion of the gasoline and/or water already in the tank.

Another important characteristic of this new system also relates to filling the tank or tanks 5 from barges and oil tankers at water level where filling can not be accomplished by gravity flow as in the above-described case of tank cars above the ground. It is sometimes necessary to run a hose line several thousand feet from a gasoline tanker in a harbor to the storage tanks at an air field. High pressure pumps on the tanker propel the gasoline through the hose line at considerable pressure, say upwardly of 100 pounds, which is much higher than the normal 30 or 40 pound water pressure from the water-feed pipe 28. Under this condition, with an inflow of gasoline through the check-fill pipe 6 at barge-pump pressure, it will be seen that the water temporarily and automatically stops flowing through the open water-control valve 33 (Figure 2) when the tank 5 is being filled from a barge. If a dispensing operator at a station or stations 9, 10 sets the remote control 18 to dispense (while the tank is being filled from a barge) it transpires that the dispensing operation ensues by reason of the pressure of gasoline flowing into the tank for storage purposes and not at all due to the water pressure from feed pipe 28.

Under the several foregoing conditions, the remote-dispensing station control manual 18, together with the fill check means 6, 54, and the master-control valve 24, operates in combination to produce a fool-proof oil-handling system of such improved character that filling of the underground storage tanks and dispensing therefrom are readily and conveniently accomplished.

The advantage of relieving the system of its dispensing pressure, at the end of every dispensing operation, is not to be overlooked. The open master-outlet valve 34, with the valve housing 24 full of water up to the spill port 38, leaves the tank 5 at normal-atmospheric pressure but nevertheless sealed against outside atmosphere entry to the tank 5. While a storage system for handling gasoline must not leak, nevertheless, should a leak develop somewhere in the piping or joints, it will be seen that this is not serious due to the fact that the system remains at ordinary atmospheric pressure at all times except during a dispensing operation. Where the water pressure is merely stopped (but not removed) as in former types of apparatus, a small leak may not only waste a large amount of gasoline but create a fire hazard. The invention aids in solving those problems by maintaining the tank 5 in balance with atmospheric pressure so as to avoid all tendency to breathe.

The capacity of the large valve housing 24 not only provides water-covered or immersed valve means 33, 34 constantly open to atmosphere through its water spill port 38 when not dispensing, but also provides a water-chamber means of sufficient volume always to form a yieldable hydraulic cushion-like seal between the gasoline tank 5 and the open spillways 38 and 27. Thus it is that air cannot enter through the open water spill port 38 and into the pipe 29 or tank 5. Also, since the water seal trapped in chamber 24, between the sealed tank and unsealed spill port 38, always remains in balance at atmospheric pressure, it follows that the two liquids in the tank (water and gasoline) are likewise at atmospheric pressure and the tank is completely full of liquids to its roof, thereby inhibiting air space or air pockets. This condition prevents the tank from tending to breathe, that is, prevents the drawing of air into the system in the event of a negative pressure developing therein and also prevents the forcing of liquid outwardly in the event of positive pressure developing therein.

Thus, the gasoline is stored at atmospheric pressure but without atmospheric contact irrespective of all variables such as the change in quantity of gasoline due to dispensing or filling operations, or due to liquid expansion or contraction arising from temperature variations, all coupled with the fact that the hydraulic elastic water seal chamber 24 instantly restores the system to atmospheric pressure at the end of each dispensed operation. This water chamber is always filled and remains full of water by reason of trapping water from the piping system each time water flows in either direction through the tank pipe 29 in connection with either dispensing the immiscible liquid or filling the tank with such liquid.

It will be seen that the master water-control valve 24 essentially comprises a pair of water-power valves 33 and 34 and a pair of water-relay valves 44 and 45. This quadruple water-valve means is adequate for all purposes in the system. In other words, we have designed and constructed a valve apparatus characterized by the four valves in question (33, 34, 44 and 45) which performs all these functions without the necessity of including a fifth and sixth valve-and-port means for by-passing and pressure-relieving functions, the latter being inherent in the four valve means.

Incidentally, other inventive features useful in connection with our storage and dispensing system have been omitted as they are covered in certain of our other patents. For example, a hydraulic system of preferred commercial form, embodying the present invention, includes an interlock control between the lid means 22 of the fueling-pit box 9, 10 and the manual control 18 so as to merely require the fueling-pit box lid to be closed to automatically open the switch 21 and close the shut-off valve 16, thereby rendering the system entirely safe and less dependent upon the operator.

Also, our hydraulic system of preferred commercial form includes a further control operated by a differential-float means within the storage tank 5 for the purpose of automatically shutting off the gasoline-filling operation, hence the stopping of the out-flow of water through the tank pipe 29, when the gasoline filling operation approaches the end and the water level has receded to a predetermined low position in the tank (Figure 1). Likewise, the commercial form of the apparatus employs a float-control within the tank to automatically shut off the dispensing flow of gasoline through the pipe line 8, thereby preventing water from entering said dispensing line, when the water level rises upwardly to a position near the top of the tank due to the gasoline in storage reaching a minimum predetermined volume floating on a maximum volume of water. These and other features which are actually employed in our commercial hydraulic system are covered elsewhere, and hence are omitted from this disclosure for the purpose of clarity.

It will be seen that a hydraulic storage and dispensing system of this character is noiseless in operation because it is entirely free of motor-driven pumping apparatus and other like mechanical equipment. The dispensed gasoline is clear and clean; and it is entirely free of any metallic particles or sediment which may come from motor-driven dispensing pumps. Likewise the stored gasoline is free of air and is of original freshness and strength irrespective of the time period of storage. Note also that the dispensed gasoline is water-free because if there is any water in the gasoline when it is initially stored in the tank 5, the water content precipitates from the gasoline to the bottom of the tank and merely adds to the volume of displacement water on which the gasoline is stored.

This invention is presented to fill a need for improvements in a hydraulic storage and dispensing system. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A valve for water control, comprising a housing having a pipe connection, a master-valve chamber in the housing also having a pipe connection but located below the first pipe connection, an inlet valve head arranged to normally close the first pipe connection, an outlet valve head arranged to normally open the second pipe connection; whereby water flow is permitted in one direction only through the first pipe connection namely into the valve housing, but in both directions in the second pipe connection; a drain port opening outwardly from the valve housing above the second pipe connection, diaphragm-and-weight means associated with the inlet and outlet valve heads to shift the positions of the latter, a relay-valve chamber in the housing and a water passage therefrom to a diaphragm chamber formed in the housing below the diaphragm-and-weight means, and valve means in the relay-valve chamber for controlling the flow of water through the passage.

2. A hydraulic storage and dispensing system for gasoline and the like comprising, in combination, a storage tank adapted to be filled with gasoline or the like floating on water, suitable meter dispensing station means connected with the tank for dispensing the stored gasoline therefrom, a water-feed pipe entering the tank to admit water to the bottom thereof under pressure to force gasoline to the dispensing station; master-valve means included in the water-feed pipe to start and stop the flow of water to the tank, and hence the gasoline to the dispensing station, also to discharge water from the tank when filling the latter with gasoline, as well as leaving the tank free of dispensing pressure when the system is at rest, and also capable of taking in or discharging an amount of water equal in volume to the natural contraction or expansion of the combined gasoline and water in the tank when the system is at rest; and water-operated means associated with the master-valve means for operating the latter by water power to start and stop the dispensing operation and also to discharge water from the tank, whereby water-power is employed not only to perform the gasoline dispensing operation but likewise to actuate the master-valve means to control said gasoline dispensing operation as well as control the discharge of water from the storage tank when filling the latter with gasoline.

3. Valve apparatus for use in connection with hydraulic storage and dispensing systems for handling gasoline and the like, wherein a water-feed pipe connects with a storage tank and also with the valve apparatus, so that water power is used for the purpose of the dispensing operation as well as the control of said valve apparatus; comprising a master-valve means adapted to be included in the water-feed pipe and having inlet and outlet ports for controlling the flow of the water to the storage tank for dispensing gasoline therefrom, a water discharge port included in the master-valve means and located at a level between the inlet and outlet ports aforesaid by which to trap water in the valve apparatus to seal the same against the intake of air, water-power means for actuating the master valve means, and relay-valve means having small inlet and outlet ports associated with the water-power means for controlling the operation of the latter.

4. Valve apparatus for use in connection with hydraulic storage and dispensing systems for handling gasoline and the like, wherein gasoline is stored on water within a tank, and wherein a water-feed pipe connects the tank with the valve apparatus, and wherein water power is used for the purpose of the dispensing operation as well as the control of said valve apparatus; comprising, in combination, a master-valve means adapted to be included in the water-feed pipe with an inlet port for controlling the flow of the water to the storage tank for dispensing gasoline therefrom and an outlet port for controlling the flow of water from said tank while filling it with gasoline, an open spillway included in the master-valve means and located at a level between the inlet and outlet ports aforesaid by which to trap water in the valve apparatus to seal the same against the intake of air, water-power means for actuating the master-valve means, relay-valve means having small inlet and outlet ports associated with the water-power means for controlling the operation of the latter, and a water jacket surrounding the master-valve means up to and in open communication with the spillway, the trapped water aforesaid covering the outlet port and acting as a cushion-like hydraulic seal to maintain the gasoline and water in the tank under atmospheric balance.

5. Valve apparatus for use in connection with hydraulic storage and dispensing systems for handling gasoline and the like, wherein gasoline is stored on water within a tank, and wherein a water-feed pipe connects the tank with the valve apparatus, and wherein water power is used for the purpose of the dispensing operation as well as the control of said valve apparatus; comprising, in combination, a master-valve means adapted to be included in the water-feed pipe and having inlet and outlet ports for controlling the flow of the water to the storage tank for dispensing gasoline therefrom and for discharging water while filling said tank, an open spillway included in the master-valve means and located at a level above the outlet port, water-power means for actuating the master-valve means, relay-valve means having small inlet and outlet ports associated with the water-power means for controlling the operation of the latter, and a water jacket surrounding the outlet ports of both the master valve and the relay valve, said jacket being refilled with water at each gasoline dispensing and tank-filling operation, whereby the tank is sealed by a hydraulic cushion-like body of water which maintains the tank at atmospheric pressure.

6. Valve apparatus for use in connection with hydraulic storage and dispensing systems for handling gasoline and the like, in which gasoline is stored on water within a tank, and a water pipe connecting the tank with the valve apparatus, and wherein water power is used for the purpose of dispensing the gasoline by displacement as well as for the control of said valve apparatus; comprising, in combination, a master-valve means adapted to be included in the water pipe and having inlet and outlet ports for controlling the flow of the water to and from the storage tank, a water jacket surrounding the valve apparatus, an open spillway communicating the water jacket to atmosphere and being located at a level above the outlet port by which to trap water in the valve apparatus to seal the same against the intake of air, water-power means for actuating the master-valve means, and relay-valve means having inlet and outlet ports associated with the water-power means for controlling the operation of the latter.

7. Valve apparatus for use in connection with hydraulic storage and dispensing systems for handling gasoline and the like, in which gasoline is stored on water within a tank, and a water pipe connecting the tank with the valve apparatus, and wherein water power is used for the purpose of the gasoline dispensing operation as well as the control of said valve apparatus; comprising, in combination, a master-valve means adapted to be included in the water pipe and having inlet and outlet ports for controlling the flow of the water to and from the storage tank, diaphragm-actuated means for controlling the master-valve means, relay-valve means having inlet and outlet ports associated with the diaphragm-actuated means, a water jacket enclosing all valve ports aforesaid, a spillway in the water jacket opening to atmosphere at a level above both of the outlet ports aforesaid, and said jacket being maintained full of water received from the water pipe for maintaining an atmospheric balance of the water and gasoline in the tank.

8. A hydraulic storage and dispensing system for gasoline and the like comprising, in combination, a storage tank adapted to be filled with gasoline or the like floating on water, meter-dispensing station means connected with the tank for dispensing the stored gasoline therefrom, a water pipe entering the tank to admit water to the bottom thereof under pressure to force gasoline to the dispensing station; master-valve means included in the water pipe to start and stop the flow of water to the tank, and hence the gasoline to the dispensing station, also to discharge water from the tank while filling the latter with gasoline, and to leave the tank free of dispensing pressure when the system is at rest; water-operated means associated with the master-valve means for operating the latter by water power to start and stop the dispensing operation and also to discharge water from the tank, whereby water power is employed not only to perform the gasoline dispensing operation but likewise to actuate the master-valve means; and a water chamber surrounding the master-valve means and immersing the latter in water, the chamber being maintained full of water received from the water pipe, a spillway port located high in the water chamber and open to atmosphere, whereby water trapped in the chamber acts as a hydraulic cushion-like seal to exclude air from the storage tank while permitting water to move either to or from said tank after each dispensing operation by which to place the gasoline and water therein under atmospheric pressure.

9. Valve apparatus for use in connection with hydraulic storage and dispensing systems for handling gasoline and the like, wherein a water pipe connects with a storage tank and also with the valve apparatus, so that water power is used for the purpose of the dispensing operation as well as the control of said valve apparatus; comprising a master-valve means adapted to be included in the water pipe and having inlet and outlet ports for controlling the flow of the water to the storage tank for dispensing gasoline therefrom and also for discharging water from said tank while filling it with gasoline, an open water spill port included in the master valve means and located at a level above the valve outlet port by which to trap water in the valve apparatus to immerse said outlet port in water to seal it against the intake of air, water-power means for actuating the master-valve means, and relay-valve means having inlet and outlet ports associated with the water-power means for controlling its operation.

10. A hydraulic storage and dispensing system comprising, in combination, a storage tank, dispensing-station means connected with the storage tank, a water-piping system connected with the bottom of the tank through which water under pressure flows thereinto and subsequently discharges therefrom to a water spillway; valve means included in the piping system, said valve means including an inlet port in communication with the piping leading to the tank which when opened directs the flow of water thereinto for dispensing a stored immiscible liquid therefrom, and also including a water-submerged outlet port in communication with the spillway which when opened discharges water from the tank while being filled with immiscible liquid and remaining open when not dispensing same, thus providing for a movement of water balanced by atmospheric pressure to and from the tank when not dispensing the immiscible liquid to compensate for a variation in the volume of the two liquids therein so as to maintain the tank completely full of said liquids irrespective of contraction and expansion thereof, and means for operating the valve means by which to close the outlet port when the inlet port is open and vice versa; and water-chamber means included in the piping system between the tank and the spillway and in communication with the valve means, said water-chamber means always being open to atmosphere through the spillway when not dispensing, and being maintained full of water received from said piping system to submerge the outlet port when the latter is open as aforesaid and to act as a cushion-like hydraulic seal for excluding the atmosphere from the aforesaid water-submerged outlet port, also for maintaining the liquids in the tank at atmospheric pressure when the outlet port is open, and for restoring the tank to atmospheric pressure after each dispensing operation.

11. A hydraulically operated master valve, adapted to be connected in a water pipe line leading to a gasoline storage tank for supplying water thereto and dispensing gasoline therefrom, comprising a valve housing having an inlet port and an outlet port with valve heads for alternately opening and closing said ports, a diaphragm chamber carried by the valve housing, a diaphragm mounted in the latter chamber and operatively connected with the valve heads to simultaneously open one port and close the other port, relay valve means as well as water passages connecting the pipe line with the diaphragm chamber and adapted to be manually controlled for controlling the operation of the diaphragm, in combination with water-chamber means also adapted to be connected in the water pipe line, a water passage leading from the diaphragm chamber to the water-chamber means, the water-chamber means being arranged in communication with the housing for supplying water to submerge the outlet port, and a spill port provided at the upper portion of the water-chamber means which is always open to atmosphere and said spill port being located above the outlet port of the valve, the water-chamber means being maintained full of water received from the water pipe line in which it and the valve housing are connected to submerge the open outlet port as aforesaid, also to act as a cushion-like hydraulic seal for excluding the atmosphere from the submerged outlet port, as well as to equalize the pressure on each side of the water-chamber means, and hence maintain an atmospheric-pressure balance on both sides of the submerged outlet port.

WILLIAM J. PETER.
ALBERT C. KAESTNER.